Jan. 2, 1968  R. J. WOJCIKOWSKI  3,361,009
DIFFERENTIAL TRANSMISSION INCLUDING THEREIN
A RESILIENTLY LOADED CLUTCH MEANS
Filed June 10, 1965  5 Sheets-Sheet 1

INVENTOR.
RICHARD J. WOJCIKOWSKI
BY Harold D. Hall
Walter E. Pavlick
ATTORNEYS

United States Patent Office 3,361,009
Patented Jan. 2, 1968

3,361,009
DIFFERENTIAL TRANSMISSION INCLUDING THEREIN A RESILIENTLY LOADED CLUTCH MEANS
Richard J. Wojcikowski, Toledo, Ohio, assignor to Dana Corporation, Toledo, Ohio, a corporation of Virginia
Filed June 10, 1965, Ser. No. 462,890
11 Claims. (Cl. 74—711)

ABSTRACT OF THE DISCLOSURE

A differential transmission is provided having a pair of spaced coaxial side gears disposed in the housing, compensating gears drivingly connected to the side gears and a clutch means interposed between each side gear and adjacent portion of the differential housing. A spring arrangement for preloading the side gears engages one of the clutch means independent of its respective side gear to impose its biasing force on the clutch means while the same spring arrangement preloads the other operative half of the differential directly through the other side gear. This arrangement yields a compact differential since the operating parts of the differential have limited space requirements.

---

This invention relates generally to differential transmissions including therein resiliently loaded clutch means for inhibiting the differential action thereof and more particularly to such a differential transmission including a pair of clutch means wherein communal or common resilient means is utilized to simultaneously apply a load to both of the clutch means.

While many differentials are known from the prior art which include clutch means disposed between each of the side gears and the differential housing and wherein various types and variously positioned resilient means are utilized to impose an engaging load upon the clutch means, the structure of such differentials are not always conducive to the construction of a truly compact differential transmission which occupies a minimum of space. Thus, in many instances, differentials according to the prior art will not be interchangeable with a compact conventional differential that they are meant to replace.

Such prior art differential transmissions utilize many types and arrangements of means resiliently loading the clutch means, such as: spring means disposed intermediate the side gears which bias the gears axially outwardly to engage and load the clutch means; spring means disposed intermediate the side gears and including means extending peripherally of both side gears to engage the clutch means and apply a load thereto independently of the gear train; and separate spring means associated with each clutch means for loading the same with the load of the spring means being either independent or dependent upon the side gears.

Where the spring means is disposed intermediate the side gears, such is limited in size by the space available and competes for space with the compensating gears and compensating gear shaft or cross pin. When separate spring means are associated with each clutch means, such not only requires a plurality of spring means but also occupies space which could be utilized for the clutch means or, if the spring means is an active part of the clutch means, may be limited in size and thus in effectiveness, due to space requirements.

It is, therefore, an object of this invention to provide a differential transmission having clutch means therein disposed between one of the side gears and the housing and wherein a resilient means imposes a resilient load on the clutch means independently of the other of said side gears.

Another object of this invention is to provide a differential transmission having a separate clutch means of the resiliently loaded type associated with each side gear yet is very compact and effective in operation.

A further object of this invention is to provide a differential transmission as described immediately above wherein the clutch means, while having substantially equal clutching effect, have different dimensions.

It is another object of this invention to provide such a differential transmission utilizing common resilient means for loading both of the clutch means.

Another object of this invention is to provide a differential transmission as described immediately above wherein a resilient means disposed between one side gear and the housing applies a load to both clutch means.

Yet another object of this invention is to provide a differential transmission with a separate clutch means disposed between each side gear and the associated portion of the differential housing wherein communial spring means loads one of the clutches in a different manner than it loads the other of the clutches.

Further and other objects of this invention will become apparent upon a consideration of the following detailed specification in view of the drawings wherein.

Figure 1:
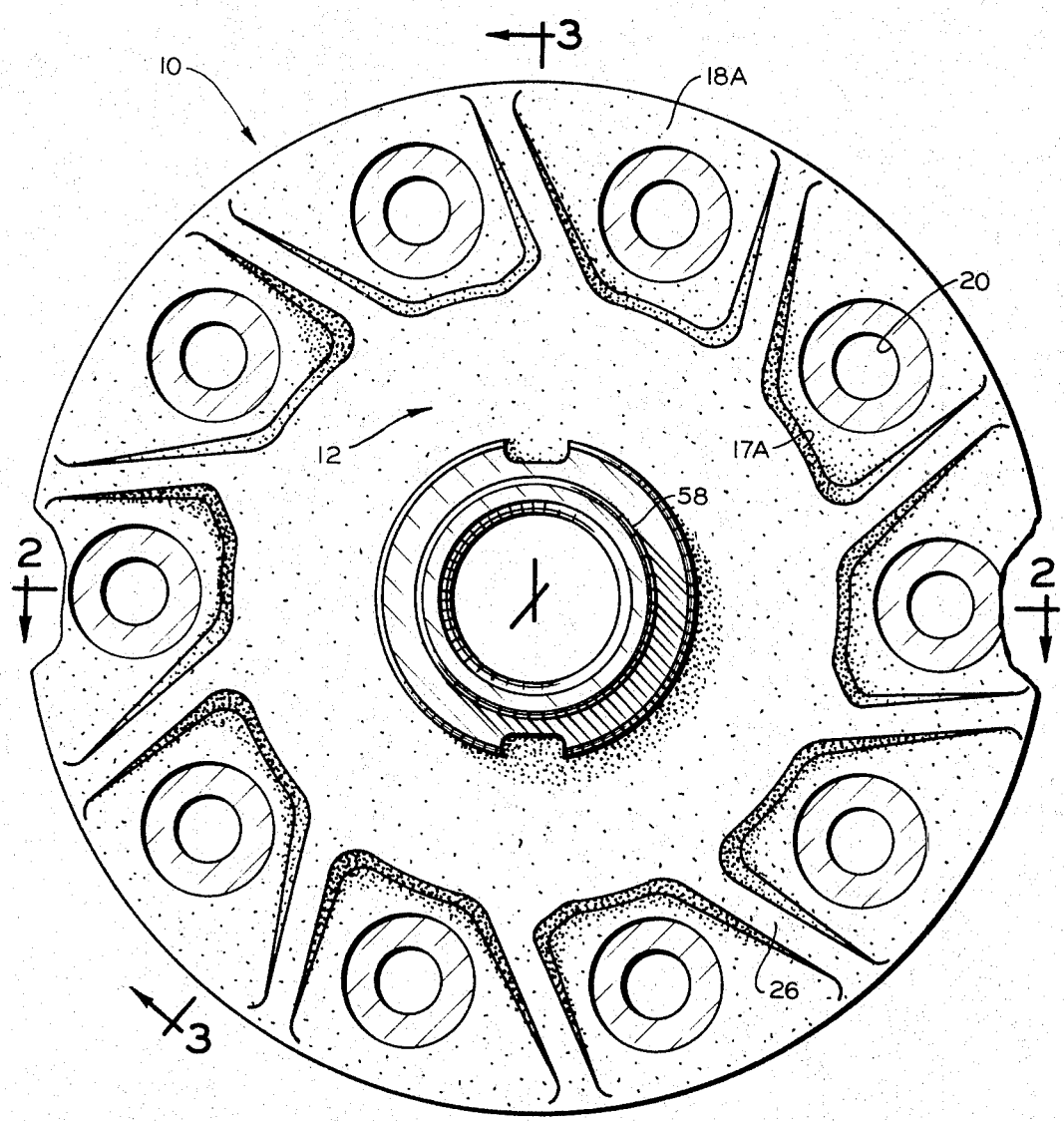
FIG. 1 is an end elevational view of a differential transmission embodying this invention.
Figure 3:
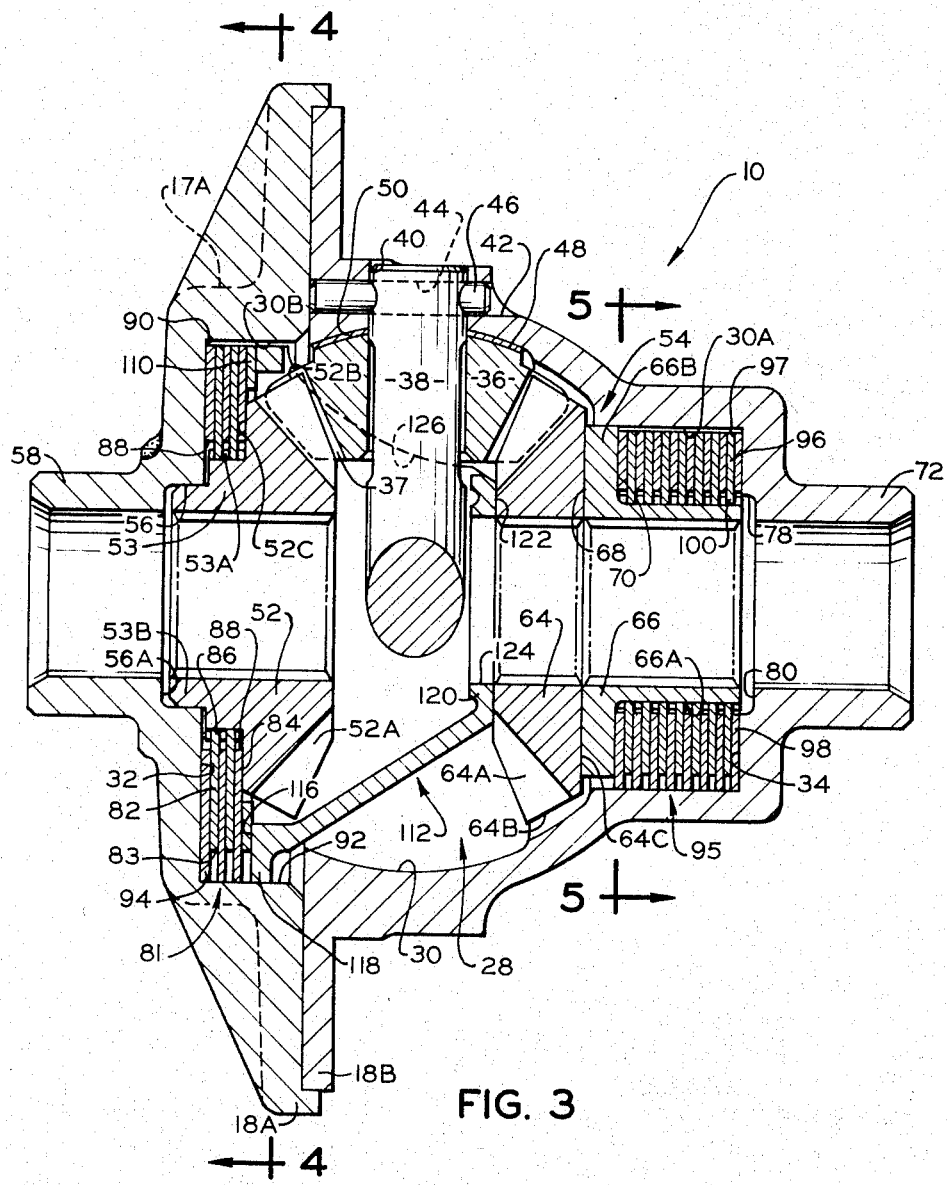
FIG. 3 is a longitudinal sectional view taken along the lines 3—3 in FIG. 1.
Figure 4:
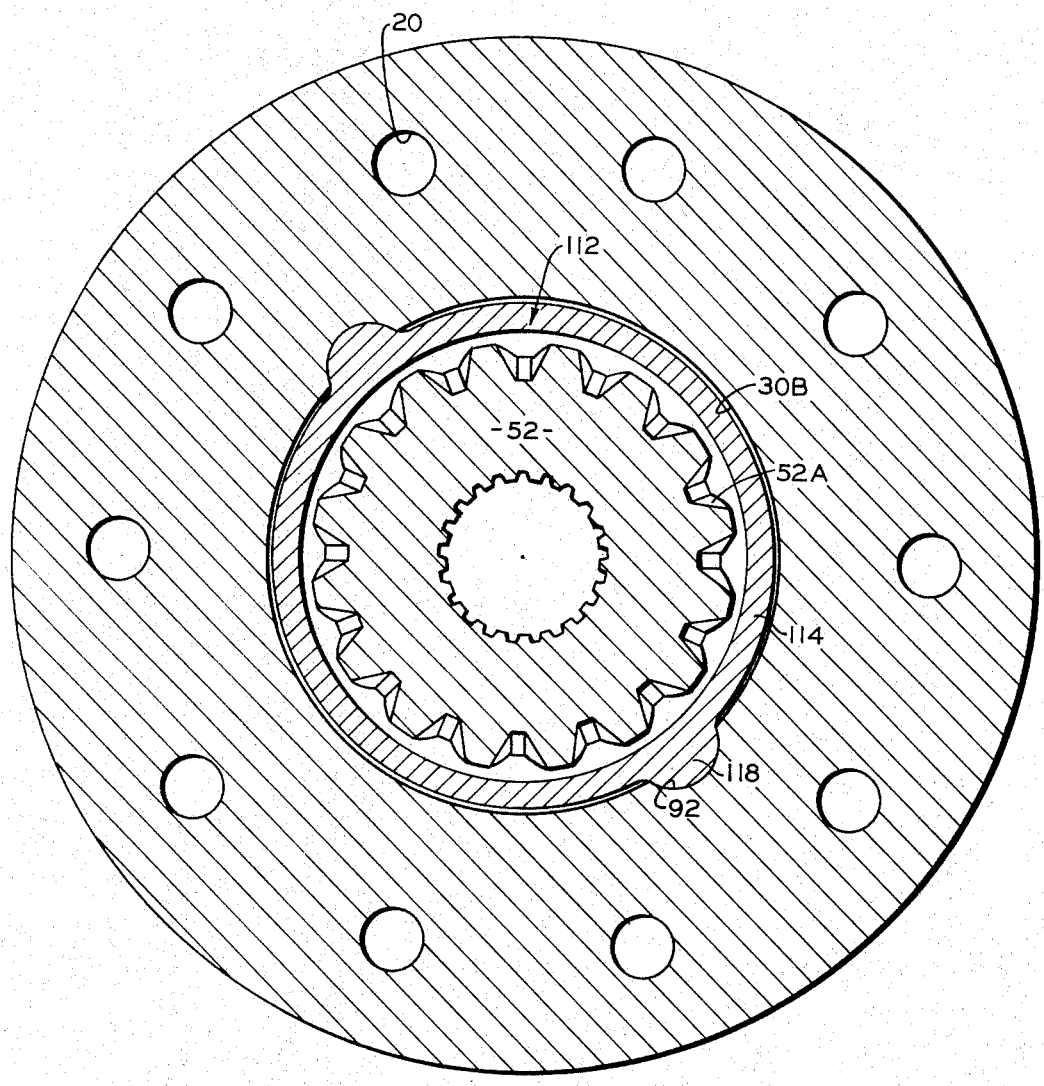
Figure 6:
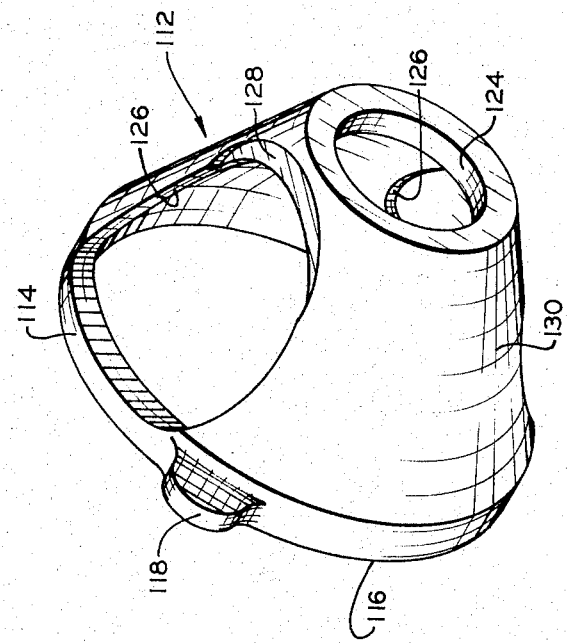
Figure 5:
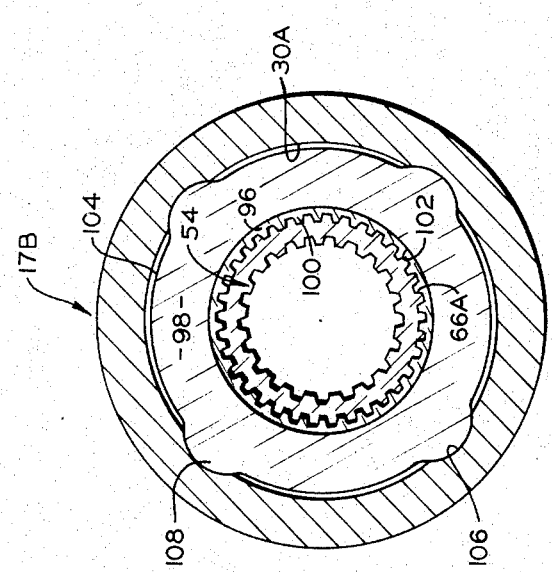

FIGS. 4 and 5 are cross sectional views of the differential transmission of FIG. 1 taken along the lines 4—4 and 5—5 respectively in FIG. 3, the Belleville spring being omitted in FIG. 4 for added clarity; and FIG. 6 is an isometric view of a component of the differential transmission of FIG. 1.

In a preferred embodiment of this invention, a differential transmission, including a housing, a pair of spaced coaxial side gears disposed in the housing, compensating gears drivingly connected to the housing and intermeshed with the side gears and a clutch means interposed between each side gear and the adjacent portion of the differential housing, is provided with common resilient means for imposing a load on both of the clutch means. The resilient means is disposed between one of the side gears and the adjoining portion of the housing and imposes a load on the clutch means associated with the one side gear independently of the one side gear. A transmitting element, extending independently and peripherally of said one side gear, transmits the load of the resilient means to the other side gear and urges the same into a pressing engagement with the clutch means associated therewith so that the resilient means is operative to impose its load on both clutch means. Further, means is provided responsive to the transmission of torque by the differential for applying a load to the clutch means; such means, in the preferred embodiment, takes the form of positive pressure angle teeth on the side gears and compensating gears which, in response to the transmission of torque thereby, urge the side gears axially outwardly to impose a load on the clutch means.

Referring now to the drawings, a differential transmission is shown generally at 10 and includes a two-piece housing 12 made from axially separable portions 14 and 16; the portions respectively including juxtaposed flanges 18A and 18B which are adapted to be secured together, thereby uniting the portions 14 and 16, by means of a plurality of bolts (not shown) passing through a plurality of circumferentially spaced and axially aligned openings 20 therein. The right face of the flange 18B is also adapted to have a conventional ring gear, a fragment of which is shown in section at 22 in FIG. 3, drivingly secured thereto, as by the bolts in openings 20; which ring gear is driven by a conventional input pinion gear, shown fragmentarily in section at 23. Since the conventional ring gear must be of considerable pitch diameter to transfer the required torque in a suitable reduction ratio from the input pinion 23 to the housing 12, the bore 24 therein is of a substantial diameter. Accordingly, the periphery 17 of the housing 12 in the vicinity of the ring gear 22 may be made substantially as large as the bore 24 without intruding upon space available for other components, and in the vicinity of the flange 18A, having reinforcing webs 26 which additionally function as oil slingers, the external periphery 17A of the housing also may be made substantially large.

The external periphery of the housing adjacent the inner end 23A of the pinion 23 is substantially reduced in size as shown at 17B when compared to the periphery 17 thereof, since the housing 12 is of the compact type and, therefore, suitable for utilization with straddle mounted pinions of the type represented by the pinion 23; the inner end 23A thereof being conventionally adapted to have a bearing support means mounted thereon for rotatably supporting the inner end of the pinion 23 in the differential carrier (not shown).

Figure 2:
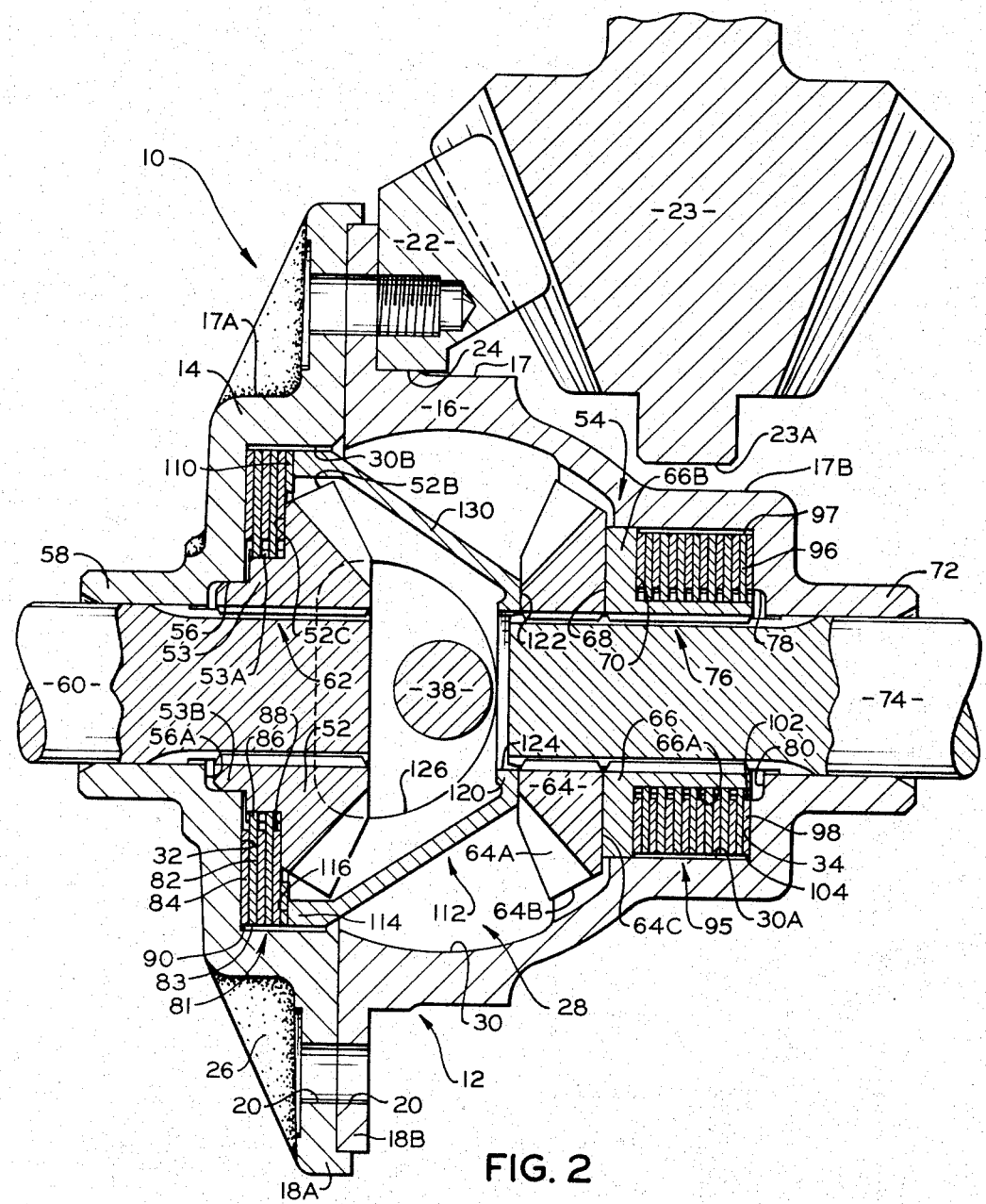
FIG. 2 is a longitudinal sectional view taken along the lines 2—2 of FIG. 1 including a fragmentary representation of the axle shafts driven by the unit, a fragmentary representation of a ring gear and pinion gear for driving the unit such ring and pinion gears being shown in section, and with a compensating gear of the differential gear train omitted for clarity purposes.

The housing 12 has an axially elongated cavity 28 therein bounded peripherally by three coaxial internal walls formed in the housing and including an intermediate and generally spherical wall 30 disposed in the left part of the portion 16, a cylindrical wall 30A disposed to the right of the spherical wall 30 and in the part of the portion 16 having the reduced periphery 17B, and a wall 30B disposed in the portion 16 to the left of the spherical wall 30 and in the part of the portion 14 having the periphery 17A, and is bounded axially by end walls 32 and 34, on the left and right and in the portions 14 and 16 respectively, as viewed in FIGS. 2 and 3.

A pair of spaced coaxial compensating gears 36, having tooth portions 37, are disposed in the cavity 28 with their axes positioned transversely with respect to the longitudinal axis of the housing 12 (only one compensating gear being shown in FIG. 3), which compensating gears are drivingly connected to the housing 12 for unitary coaxial rotation therewith and being simultaneously rotatable about their own axes by means of a transversely extending cross pin 38 secured in aligned transverse openings, one of which is shown at 40, formed in the housing 12. An axially extending opening 42 is formed in the housing 12 and positioned in alignment with an opening 44 formed in the cross pin 38 adjacent its upper end and a locking pin 46 is pressed into the openings 42 and 44 to securely lock the cross pin 38 in the housing 12. The outer faces 48 of the compensating gears 36 are spherically formed to cooperate with the spherical wall 30 and a conventional thrust washer 50, having both spherical internal and external surfaces, is disposed therebetween.

A pair of spaced coaxial side gears 52 and 54 are disposed in the cavity 28 of the housing 12 with each being in meshing engagement with both of the compensating gears 36. The toothed portion 52A of the side gear 52 meshes with the toothed portion 37 of the compensating gears 36 and the axially inner end of the side gear is disposed in the portion of the cavity 28 bounded by the spherical wall 30 while the periphery 52B and the back or thrust face 52C of the side gear are disposed in and radially spaced from the portion of the cavity bounded by the cylindrical wall 30B. The thrust face 52C is disposed in parallel, axial spaced relationship with the end wall 32. The hub 53 of the side gear 52 includes a peripherally splined portion 53A disposed within that portion of the cavity 28 bounded by the wall 30B and radially spaced from the latter, and terminates in a reduced diameter portion 53B pilotingly received in a counterbore 56 formed in the end wall 32 of the housing 12. The counterbore 56 terminates at its left end in a shoulder 56A, and the hub 53 is axially spaced from both the inner end wall 32 and the shoulder 56A so that the side gear 52 is adapted to move axially outwardly relative to the housing. An annular flange 58, formed integrally with and extending axially to the left from the housing 12, is adapted to rotatably receive an axle shaft 60, shown fragmentarily in FIG. 2, projecting therethrough; which shaft is drivingly connected at its inner end in the bore of the side gear 52 by an axially extending splined engagement shown generally at 62, whereby the side gear 52 and axle shaft 60 rotate unitarily while the side gear is free to move axially on the axle shaft.

The side gear 54 is constructed of two portions, an inner portion 64 and an outer portion 66, for ease of manufacture; however, the portions 64 and 66 can be formed integrally or securely connected if desired. The inner portion 64 is disposed in the portion of the cavity 28 surrounded by the spherical wall 30; the teeth, periphery and back or thrust face thereof, 64A, 64B and 64C respectively, being spaced from the wall 30 and the teeth 64A meshingly engaging the teeth 37 of the compensating gears 36. The outer portion 66 of the side gear 54 includes a peripherally splined portion 66A disposed within that portion of the cavity 28 surrounded by the cylindrical wall 30A and radially spaced from the latter and an annular flange portion 66B formed integrally with and extending radially from the splined portion 66A. The flange portion 66B is pilotingly received for rotation and relative axial movement by the wall 30A and has inner and outer thrust faces 68 and 70; the inner thrust face being in thrusting engagement with the thrust face 64C of the inner portion 64 and the outer thrust face 70 being disposed in axially spaced parallel relationship with the end wall 34 of the housing 12.

The housing 12 is provided with an integral annular flange 72 extending axially to the right therefrom and rotatably receiving an axle shaft 74 which extends into and is drivingly connected at its inner end in the bore of the side gear 54 by an axially extending splined connection shown generally at 76 so that the side gear 54 and axle shaft 74 rotate unitarily while the side gear is movable axially relative to the axle shaft. The end face 34 of the housing 12 is provided with a counterbore 78 terminating on the right in a shoulder 80 and the outer end of the peripherally splined portion 66A is spaced from the shoulder 80 while the flange portion 66B is pilotingly received by the wall 30A and the thrust face 64C of the side gear 54 is spaced from the housing 12 so that the side gear 54 may move axially relative to the housing.

Clutch means, shown generally at 81, is provided for inhibiting the rotation of the side gear 52 relative to the housing 12. More particularly, axially interposed between the thrust face 52C of the side gear 52 and the end wall 32 of the housing 12 are a first and a second plurality of interleaved annular friction plates 82 and 84.

Preferably, the axial space between the thrust face 52C and the end wall 32 is such that the plates 82 and 84 are not preloadingly compressed therebetween and that backlash is present between the compensating and side gear teeth 37 and 52A. The friction plates 82 are provided with internal teeth 86 which drivingly engage the peripheral toothed portion 53A of the side gear 52 so that the plates 82 and the side gear 52 are adapted for unitary rotation and relative axial movement. The external peripheries 83 of the plates 82 are spaced from the wall 30B so that the plates 82 are freely rotatable and axially movable relative to the housing 12. The plates 84 have a bore 88 therein which is larger in diameter than the splined portion 53A and the majority of the periphery 90 thereof closely conforms to and is spaced from the wall 30B in the housing 12.

As clearly seen in FIGS. 3 and 4, the wall 30B is provided with a pair of axially extending diametrically opposed slots 92, which slots are arcuate in cross section, and, as best seen in the lower portion of FIG. 3, the plates 84 are each provided with a pair of diametrically opposed arcuately shaped tangs 94 (only one such tang being shown in FIG. 3) extending radially from the periphery 90 thereof, which tangs register with and drivingly engage the slots 92 whereby the plates 84 are adapted for unitary rotation with and axial movement relative to the housing 12. In the upper portion of FIG. 3, which shows a position circumferentially intermediate the slots 92 and tangs 94, the periphery 90 is shown spaced from the cylindrical wall 30B.

Clutch means, shown generally at 95, is provided for inhibiting the rotation of the side gear 54 relative to the housing 12. More particularly, axially interposed between the thrust face 70 of the side gear 54 and the end wall 34 of the housing 12 are a third and a fourth plurality of interleaved annular friction plates 96 and 98. Preferably the axial space between the thrust face 70 and end wall 34 is such that the plates 96 and 98 are not preloadingly compressed by a physical interference fit and that backlash is present between the compensating and side gear teeth 37 and 64A. The friction plates 96 are provided with internal teeth 100, best seen in FIG. 5, which drivingly engage the peripheral toothed portion 66A of the side gear 54, so that the plates 96 and side gear 54 are adapted for unitary rotation and relative axial movement. The external peripheries 97 of the plates 96 are spaced from the wall 30A so that the plates 96 are freely rotatable and axially movable relative to the housing 12. The plates 98 have a bore 102 therein which is larger in diameter than the splined portion 66A and the majority of the periphery 104 thereof closely conforms to and is spaced from the wall 30A in the housing 12.

As clearly seen in FIGS. 3 and 5, the wall 30A is provided with four circumferentially spaced and axially extending slots 106, which slots are arcuate in cross section, and the plates 98 are each provided with four circumferentially spaced and arcuately spaced tangs 108 (the four tangs being seen in FIG. 5 while only one such tang 108 being shown in the lower portion of FIG. 3) extending radially from the periphery 104 thereof, which tangs register with and drivingly engage the slots 106 so that the plates 98 are adapted for unitary rotation with and axial movement relative to the housing 12. In the upper portion of FIG. 3, which shows a position circumferentially intermediate the slots 106 and tangs 108, the periphery 104 is shown spaced from the cylindrical wall 30A.

Communal or common resilient means are provided for imposing a resilient load upon the clutch means 81 and 95. More particularly, spring means in the form of a Belleville spring washer 110 is disposed in that portion of the chamber 28 bounded by the wall 30B, the external periphery of the spring washer being spaced from the wall 30B and the internal periphery being spaced from the external periphery 52B of the side gear 52. A transmitting element shown generally at 112 is provided to axially compress the spring washer 110, the spring washer being shown in the drawings compressed to a substantially flat position, thereby resiliently loading the clutch means 81, and to transmit the biasing force of the spring washer to the clutch means 95 for resiliently loading the latter. More particularly, the transmitting element 112 is of generally truncated conical configuration with its radially enlarged base terminating in an annular flange 114 having an outer or thrust face 116 pressingly engaging the spring washer 110 and acting as a reaction means therefor; the internal surface of the flange 114 being radially spaced from the periphery 52B of the side gear 52 and the major portion of the external surface of the flange 114 being spaced from the wall 30B. The flange 114 is provided with a pair of diametrically opposed arcuately shaped tangs 118 which register with and drivingly engage the slots 92 in the wall 30B so that the transmitting element 112 is connected to the housing 12 for unitary rotation and relative axial movement.

The right or truncated end of the transmitting element 112 terminates in a radially inwardly extending flange 120 having an outwardly facing thrust face 122 thrustingly engaging the inner end of the side gear 54; the flange 120 having a bore 124 therein slightly greater in diameter than the root diameter of the splined portion 76 of the side gear 54, and the periphery of the flange terminates radially inwardly of the location of meshing engagement of the teeth 37 of the pinion gears 36 with the teeth 64A of the side gear 64. The transmitting element 112 is provided with a pair of diametrically opposed openings 126, which openings commence on the left at the inner edge of the flange 114 and terminate at the right adjacent the flange 120 in an angularly relieved portion 128. The axial and circumferential extent of the openings 126 are dimensioned so that the compensating gears are positioned therein and free from engagement therewith, even upon slight axial movement of the transmitting element relative to the compensating gears; the angularly relieved portion 128 being disposed radially inwardly of the right side of the compensating gears 36 as seen in FIG. 3. Since the transmitting element 112 and the compensating gears 36 are both secured to the housing 12 for unitary rotation therewith, the former by the tangs 118 and the latter by the cross pin 38, no relative circumferential movement occurs between the transmitting element and the compensating gears to cause the undesired engagement and the resilient load of the spring washer 110 is transmitted to the clutch means 95 not only independently of the side gear 52, but also independently of the compensating gears.

It is thus seen that the body portion 130 of the transmitting element 112, that conically shaped portion intermediate the flanges 114 and 120 thereof, extends from the flange 114 axially to the right and angularly inwardly to the flange 120, and occupies available space which is not being utilized for other purposes. In the event that four compensating gears are utilized instead of the pair of compensating gears 36 discussed hereinbefore, the transmitting element 112 can be adapted to accommodate the same by providing, for example, a second pair of openings positioned on an axis 90° from the axis of the openings 126, so that the remainder of the body portion 130 still only occupies available space.

Since the periphery 17B and the bore 30A of the housing 12 surrounding the clutch means 95 is substantially reduced in size from that of the periphery 17A and bore 30B surrounding the clutch means 81, the effective diameter of the third and fourth friction plates 96 and 98 is limited and substantially less than the diameter of the first and second friction plates 82 and 84; the reduction in diameter of friction members, resulting in a reduction of the mean radius thereof, and its effect on the clutching action obtained is well known. To compensate for this reduced diameter of the friction means 95, a different dimension thereof has been increased, and to this end a greater plurality of third and fourth friction plates 96 and 98 than first and second friction plates 82 and 84 is provided, the number of plates 96 and 98 being chosen with respect to the number of plates 82 and 84 so that with the same engaging load thereon the clutching values will be substantially equal.

As shown, there are a total of five plates 82 and 84 arranged so as to have four acting friction surfaces therebetween in addition to the friction surface between the right plate 84 and the face 52C of the side gear 52, while there are a total of 15 plates 94 and 96 arranged to have 14 friction surfaces therebetween in addition to a friction surface between the left plate 98 and the face 70 of the side gear 54. Further, since the periphery 17B of the housing is reduced in size, there is no space available for a transmitting element to extend peripherally of the gear 54 and engage the clutch means 95, and any resilient means which would be associated with the clutch means 95 and positioned intermediate the housing 12 and the side gear 54 would be limited in size and/or impose upon the space required for the clutch means 95.

As shown in the drawings, the spring washer 110 has been compressed substantially flat between the transmitting element 112 and the clutch means 81 thereby biasing the latter against the inner end wall 32 of the housing 12 to frictionally engage the plates 82 and 84 and, additionally, the spring washer reacts against the transmitting element 112 and biases the same to the right against the side gear 54 which compresses the clutch means 95 against the inner end wall 34 thus frictionally engaging the plates 96 and 98 and providing a preload on both the clutch means 81 and 95. As shown, the spring washer 110 is piloted against radial movement by means of its periphery closely conforming to the bore 30B, and disposed between a friction plate 84 and the flange 114 of the transmitting element 112, which plate and flange respectively are provided with tangs 94 and 118 so that no relative rotation occurs between the plate 84, flange 114, and the spring washer 110. Thus, while such could be provided if desired, there is no need for the spring washer 110 to include means for inhibiting the same from rotating relative to the housing, since it is held from rotating by the plate 84 and flange 114. If the plate to the left of the spring washer 110 was one of the plates 82, splined to the side gear 52 instead of a plate 84, then relative rotation would take place between the plate 82 and the flange 114, and in this event it would be desirable to fix the spring washer aganist rotation relative to either the plate 82 or to the flange 114; such as by providing peripheral tangs thereon for engagement with the slots 92 and thus inhibiting the rotation thereof relative to the flange 114 or by providing a splined engagement between the washer and the side gear. Additionally, it is understood that any one or more, or all of the friction plates 82 and 84 can be formed as spring washers and thus, since they are compressed substantially flat, function not only in the capacity of a member of the clutch means 81 but also as the means for providing a resilient load upon both of the clutch means, such resilient means acting between the end wall 32 and the transmitting element 112 to load the clutch means 81 and through the transmitting element and the side gear 54 to thus also impose its resilient load upon the clutch means 95.

Means in addition to the Belleville spring washer 110 is provided for imposing a load upon the clutch means 81 and 95. More particularly, the teeth 37 of the compensating gears 36 and the teeth 52A and 64A of the side gears 52 and 54, respectively, are of the positive pressure angle type which, as is well understood, generate a separating force when transmitting torque. Thus, upon the transmission of torque between the compensating gears 36 and side gears 52 and 54, the side gears are urged axially outwardly so that the side gear 52 compresses the clutch means 81 between the thrust face 52C thereof and the end wall 32 of the housing 12 while the side gear 54 compresses the clutch means 95 between the thrust face 70 thereof and the end wall 34 of the housing 12; the side gear 52 imposing its load upon the clutch means 81 independently of the spring washer 110, while the side gear 54 is urged outwardly by both the spring washer 110 and the thrust of the gear teeth 36 and 64A.

It is therefore apparent that a minimum load is always present on the clutch means 81 and 95 as provided by the spring washer 110, which load causes a frictional engagement of the friction plates 82 and 84 and the friction plates 96 and 98 to frictionally inhibit rotation of the side gears 52 and 54 relative to the housing and thereby prevent free differentiation of the differential transmission 10. As torque commences to be transmitted by the differential transmission so that greater clutching action is required to inhibit the differential action thereof, the side gears 52 and 54 are urged outwardly in response to the transmission of such torque and cause further clutch engagement to frictionally inhibit such differential movement. While the differential movement is frictionally inhibited, such is not eliminated entirely and, when such is necessary it will be accommodated by the relative rotation of the interleaved friction plates.

From the foregoing it is readily apparent that a differential transmission has been provided having a clutch means 95 disposed between the side gear 54 and the housing 12 and wherein the spring washer 110 imposes a resilient load on the clutch means 95 independently of the side gear 52 and independently of the compensating gears; wherein the side gear 52 also has a clutch means disposed between the same and the housing 12 and the resilient washer communally imposes a resilient load on both of the clutch means; wherein the resilient spring washer 110 is disposed intermediate the side gear 52 and the housing 12 and yet applies a resilient load to both of the clutch means; and wherein the resilient spring washer 110 loads the clutch means 81 independently of the side gear 52 while loading the clutch means 95 through the side gear 54.

While only a single embodiment of this invention has ben shown and described, it is readily apparent that many variations in addition to those discussed herein can be made therein without departing from the scope of this invention as defined in the following claims.

What is claimed is:

1. A differential transmission comprising in combination a housing having an axis of rotation, a differential gear train disposed in said housing and including a pair of first and second axially spaced toothed side gears coaxially and rotatably mounted in said housing, first clutch means disposed axially outwardly of the teeth of said first side gear and between said first side gear and said housing for inhibiting relative rotation therebetween, second clutch means disposed axially outwardly of the teeth on said second side gear and said housing for inhibiting relative rotation therebetween and spring means disposed and reacting directly between said first clutch means and a transfer means and being disposed radially outwardly of said first side gear, said transfer means imposing the biasing force of said spring means directly on said second side gear.

2. The differential transmission according to claim 1 including means responsive to the torque being transmitted by said differential transmission for urging said second side gear axially outwardly to impose a load on said clutch means.

3. A differential transmission according to claim 1 wherein said gear train, in addition to said pair of side gears, also includes a pair of toothed compensating gears meshingly engaged with said side gears and with the axes thereof disposed transversely with respect to the axis of said housing, means drivingly connecting said compensating gears to said housing for coaxial rotation therewith while allowing said compensating gears to rotate about their own axis, said compensating and side gears having positive pressure angle teeth for transmitting torque therebetween and for urging at least said second side gear axially outwardly upon the transmission of torque therebetween whereby said second side gear is constantly urged axially outwardly by said resilient means and is urged axially outwardly in response to the torque being transmitted by said differential transmission.

4. The differential transmission defined in claim 1 wherein said second side gear has a first portion thereof facing axially outwardly, said housing has a first portion thereof facing axially inwardly and disposed in axially spaced and cooperative relationship with the first portion of said side gear, said second clutch means is disposed between said first portions and includes at least a pair of friction surface means second of which is rotatable with said one side gear and the other of which is rotatable with said housing, and said second side gear in being urged axially outwardly by said resilient means compressing said friction surface means between said first portions and into a resiliently loaded frictional relationship.

5. A differential transmission comprising in combination a housing having an axis of rotation, a differential gear train disposed in said housing and including at least a pair of axially spaced side gears carried by said housing for coaxial rotation relative thereto, a first clutch means disposed between one of said side gears and said housing for inhibiting relative rotation therebetween in response to axially outward movement of said one side gear, a second clutch means disposed between said other side gear and said housing for frictionally inhibiting relative rotation therebetween, and an axially extending resilient means having a first and second operative end, said first end engaging said one side gear and urging the same axially outwardly to frictionally engage said first clutch means and said second end engaging said second clutch means independently of said other side gear and resiliently biasing said second clutch means into frictional engagement.

6. The differential transmission defined in claim 5 wherein said other side gear has an innner portion and a periphery spaced from said housing, said second clutch means is disposed axially outwardly from the inner portion of said other side gear, and said resilient means extends peripherally and independently of said other side gear into engagement with said second clutch means.

7. The differential transmission as defined in claim 6 wherein said resilient means includes a spring means and a transmitting means, said spring means is disposed axially outwardly from the inner portion of said other side gear, and said transmitting portion extends peripherally of said other side gear and operatively connects said spring means to said one side gear for transmitting the biasing effect of said spring means to said one side gear.

8. A differential transmission comprising in combination a housing having an axis of rotation, a differential gear train disposed in said housing and including compensating gear means and a pair of axially spaced side gears mounted in said housing for coaxial rotation relative thereto, a separate clutch means associated with and disposed between each of said side gears and said housing, and communal resilient means for imposing a resilient engaging force on both of said clutch means, the biasing effect of said resilient means being imposed upon one of said clutch means through the side gear associated therewith by direct abutment therewith and being imposed upon the other of said clutch means by direct abutment therewith independently of both the side gear associated therewith and said compensating gear means.

9. A differential transmission comprising in combination a housing having an axis of rotation, a differential gear train disposed in said housing including a pair of axially spaced toothed side gears coaxially and rotatably mounted in said housing, clutch means disposed axially outwardly of the teeth of one of said side gears and between said one side gear and said housing for inhibiting relative rotation therebetween, and resilient means reacting between said housing of said one side gear with the reaction thereof upon said one side gear being in a location axially inwardly of the teeth thereof and with both the reaction and action biasing effect thereof being independent the remainder of said gear train for biasing a hole of said one side gear axially outwardly into a pressing relation with and imposing a resilient load upon said clutch means, said one side gear having a first portion thereof facing axially outwardly, said housing having a first portion thereof facing axially inwardly and disposed and axially spaced in cooperative relationship with the first portion of said side gear, said clutch means disposed between said first portions and includes at least a pair of friction surface means, one of which is rotatable with said one side gear and the other of which is rotatable with said housing, and said one side gear being urged axially outwardly by said resilient means compresses said friction surface means between said first portions and into a resiliently loaded frictional relationship, the other of said side gears having an axially inner portion and a periphery spaced from said housing, said resilient means extending peripherally of said other gear imposing its biasing effect upon said housing at a location axially outwardly from the inner portion of said other side gear.

10. A differential transmission comprising in combination a housing having an axis of rotation and first and second axially spaced and opposed bores and a third bore therein with said first and third bores each having a greater average radial dimension than said second bore and said third bore being disposed axially intermediate said first and second bores, a differential gear train disposed in said housing and including at least a first and second axially spaced side gear means mounted in said housing for coaxial rotation relative thereto, compensating gear means disposed in said third bore with an axis of rotation transverse to said housing axis and being in mesh with said side gear means, said first and second side gear means each having a toothed portion, axially inwardly facing teeth thereon disposed in said third bore and having a carrying portion thereof extending axially outwardly from said toothed portion and disposed in and radially spaced from said first and second bore respectively, the toothed portion of said second gear means having a periphery greater in radial dimension than the average radial dimension of said second bore and the toothed portion of said first gear means having a lesser radial dimension than the average radial dimension of said first bore, a first and a second clutch means each including a plurality of friction plates with said first clutch means being disposed within said first bore and said second clutch means being disposed within said second bore, means connecting some of the friction plates of said first clutch means to said housing for unitary rotation therewith and rotation relative to said first side gear means and connecting at least some of the remainder of said plates of said first clutch means to the carrying portion of said first side gear means for unitary rotation therewith and rotation relative to said housing, at least the axially innermost portion of said first clutch means being greater in radial dimension than said first side gear means, means connecting some of the friction plates of said second clutch means to said housing for unitary rotation therewith and rotation relative to said second gear means and connecting at least some of the remainder of the friction plates of said second clutch means to the carrying portion of said second side gear means for rotation therewith and rotation relative to said housing, the radial dimension of said second clutch means being less than the radial dimension of the toothed portion of said second side gear means, the mean radius of said first clutch means being greater than the mean radius of said second clutch means and the friction plates of said second clutch means being greater in number than the number of friction plates of said first clutch means for providing a substantially equal clutching effect irrespective of the difference in mean radius, and first means for pressing the friction plates of said first clutch means into frictional engagement for inhibiting relative rotation of said differential gear train relative to said housing, at least said second side gear means being axially movable relative to said housing, said second side gear means has an axially outwardly facing pressing portion thereon disposed axially inwardly of at least a portion of said second clutch means, said housing having an inwardly facing second abutting surface disposed in axially spaced cooperating relationship with said pressing portion and disposed axially outwardly of at least a portion of said second clutch means, said first pressing means including said second side gear means and urging means for acting upon the portion of said second side gear means in said third bore and urging the same axially outwardly to press the friction plates of said clutch means between said pressing portion of said second gear means and the abutting portion of said housing, said urging means comprises resilient means engaging said second side gear means for urging the same axially outwardly, said resilient means engaging said first clutch means and resiliently pressing the friction plates thereof into frictional engagement, said first side gear means has an axially outwardly facing pressing portion thereon disposed axially inwardly of at least a portion of said first clutch means, said housing having an inwardly facing first abutting surface disposed in axially spaced cooperating relationship with said first side gear pressing portion and disposed axially outwardly of at least a portion of said first clutch means, said urging means includes means responsive to the torque being transmitted by said differential transmission for urging both said side gear means axially outwardly to press the friction plates of said clutch means against said abutting portions of said housing and into frictional engagement, said resilient means extending peripherally of the toothed portion of said first side gear means, axially across said third bore and engaging the axially inner end of said second gear means.

11. A differential transmission defined in claim 10 wherein said resilient means comprises a spring washer and a transmitting means, said spring washer engaging said first clutch means and resiliently imposing a load thereon acting between the first abutting surface of said housing and said transmitting means, said transmitting means engaging said second side gear means and transmitting the load of said spring washer to said second side gear means whereby said spring washer acts between said housing and said second side gear means.

References Cited

UNITED STATES PATENTS

| | | | |
|---|---|---|---|
| 2,971,404 | 2/1961 | Thornton | 74—711 |
| 2,966,076 | 12/1960 | O'Brien | 74—710.5 |
| 2,855,805 | 10/1958 | Fallon | 74—711 |

FOREIGN PATENTS

| | | |
|---|---|---|
| 234,578 | 7/1961 | Australia. |
| 237,133 | 1/1962 | Australia. |
| 276,789 | 7/1914 | Germany. |
| 1,126,691 | 3/1962 | Germany. |
| 86,497 | 6/1919 | Switzerland. |

OTHER REFERENCES

Article from: Automotive Industries, Feb. 1, 1959, pp. 37 and 64, "Design and Operation of the Ford Limited Slip Differential."

DONALD J. STOCKING, *Primary Examiner.*

J. R. BENEFIEL, *Assistant Examiner.*